INVENTOR·
GLENN D. JOHNSON
BY: *Frederig E Baker*
HIS ATTORNEY

INVENTOR:
GLENN D. JOHNSON
BY: *Feeling E Baker*
HIS ATTORNEY

June 30, 1970    G. D. JOHNSON    3,517,961
HYDRAULIC PIPE CLAMP

Filed Dec. 18, 1967    5 Sheets-Sheet 4

INVENTOR:
GLENN D. JOHNSON
BY: *Freling E Baker*
HIS ATTORNEY

INVENTOR:
GLENN D. JOHNSON
BY: Felling E Baker
HIS ATTORNEY

United States Patent Office 3,517,961
Patented June 30, 1970

3,517,961
HYDRAULIC PIPE CLAMP
Glenn D. Johnson, Downey, Calif., assignor to Shell Oil Company, New York, N.Y., a corporation of Delaware
Filed Dec. 18, 1967, Ser. No. 691,519
Int. Cl. E21c 19/00
U.S. Cl. 244—86.12                                    8 Claims

ABSTRACT OF THE DISCLOSURE

A pipe clamp adapted to accommodate out-of-round pipes and pipes of different wall thicknesses comprises outer and inner concentrically arranged gripping means which are movably mounted in the open end of a housing and adapted to be moved substantially simultaneously into engagement with the outer and the inner surfaces of the open end of a pipe or conduit member.

BACKGROUND OF THE INVENTION

The present invention relates to pipe clamps and pertains more particularly to hydraulically actuated pipe clamps that are adapted to grip the end pipes of varying diameters, which pipes may be out of round.

In the handling of pipes and tubing, it is often essential that a very firm grip of the pipe be obtained without excessive damage thereto. This is especially so where a substantial amount of power or force is to be applied to the pipe. Such situations often arise in the placing of casings in wells or in pulling them from wells and in pulling conduits from the ground. Such situations also arise in the recently developed art of sonically driving pipes into the earth for well casings, conduits, or for pilings.

In the art of sonically driving pipe or tubing into the earth, it is essential that a firm, rigid connection be established between the pipe and the sonic driving head in order to effectively transfer energy therebetween. It is also essential that the connecting and disconnecting between the pipe and the driving head be carried out rapidly.

The present invention provides an effective means of quickly establishing a firm, rigid connection to the end of a pipe not heretofore possible with prior known devices. Prior known devices generally have inner and outer sets of pipe-gripping surfaces with all of the surfaces in one of the sets fixed and the other movable. However, this is generally not the situation that one encounters. Pipe diameters generally vary as much as plus or minus 1 percent of the design diameter, while pipes also have varying wall thicknesses and have varying degrees of out-of roundness. Thus, oftentimes the pipe will not go over or in, as the case may be, the fixed portion of the gripping apparatus. Many times when the pipe does go over or in the fixed portion of the apparatus, the movable portion of the gripping means exerts such a force as to exceed the elastic limits of the pipe in order to force the wall of the pipe into engagement with the fixed portion. This generally results in damage to the pipe or casing. Such prior art devices result in great waste in material and in man hours.

SUMMARY OF THE INVENTION

It is a primary object of the present invention to overcome the aforementioned disadvantages of the prior art by providing a pipe-clamping apparatus that is capable of effectively gripping a pipe that has slightly varying diameters.

Another object of the present invention is to provide an apparatus that is capable of effectively gripping pipes having varying wall thicknesses.

In accordance with the present invention, pairs of spaced-apart, opposed, and concentrically arranged gripping means are movably mounted in a housing; and camming means operatively engage said gripping means to move them into engagement with the inner and outer walls of a pipe end when placed between said spaced gripping means.

BRIEF DESCRIPTION OF THE DRAWING

A more complete understanding of the invention may be obtained from the following description when read in connection with the following drawings in which.

DESCRIPTION OF PREFERRED EMBODIMENTS

Figure 1:
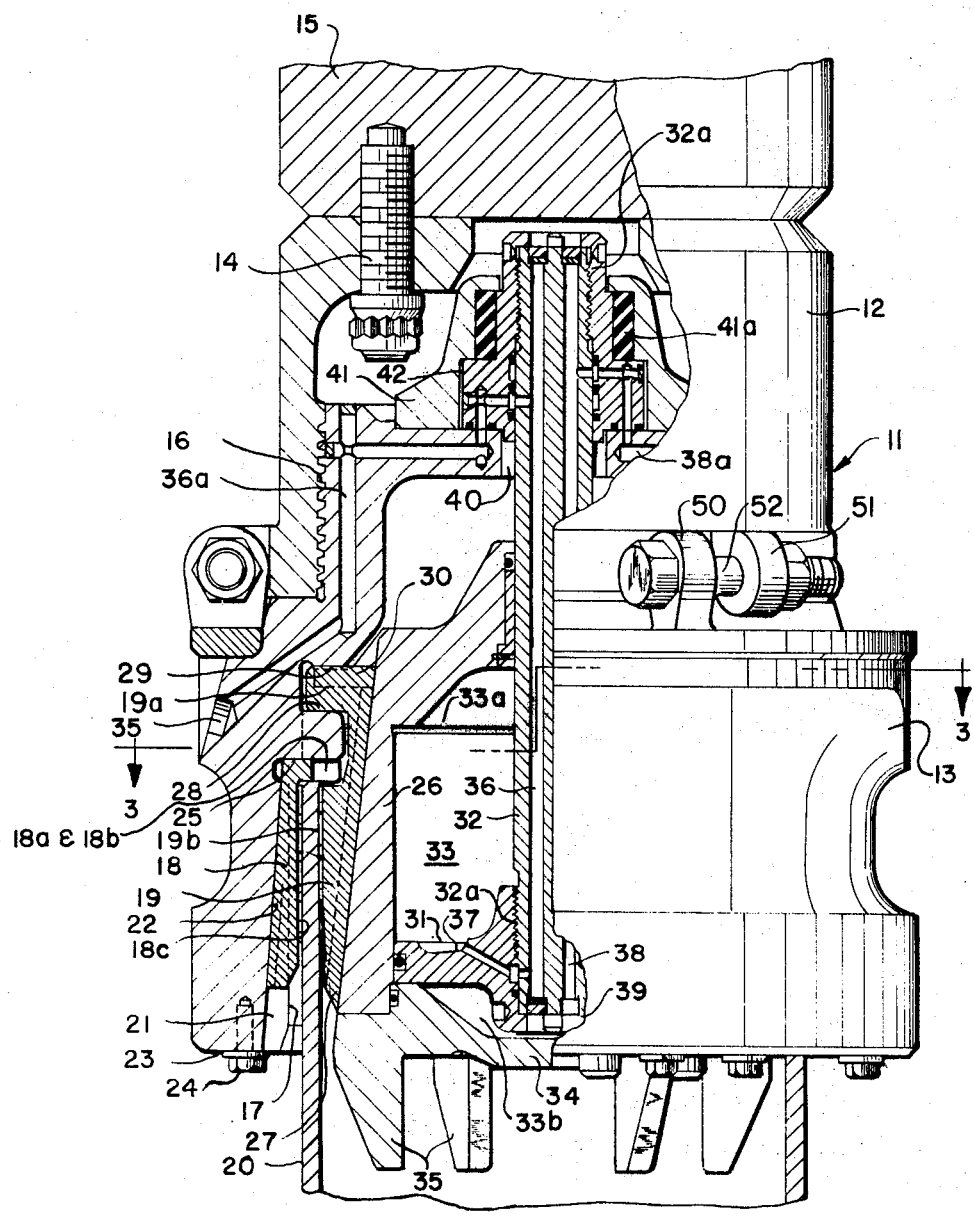
FIG. 1 is a side elevation partially in section of a preferred embodiment of the present invention shown in gripping engagement position.
Figure 3:
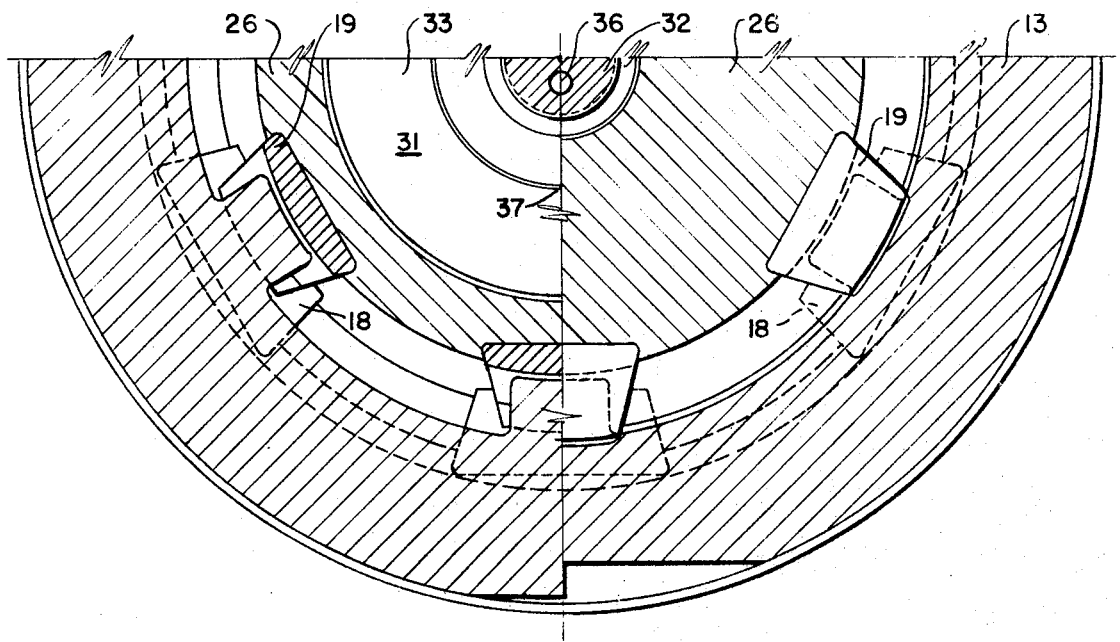
FIG. 3 is a section taken along lines 3—3 of FIG. 1.
Figure 4:
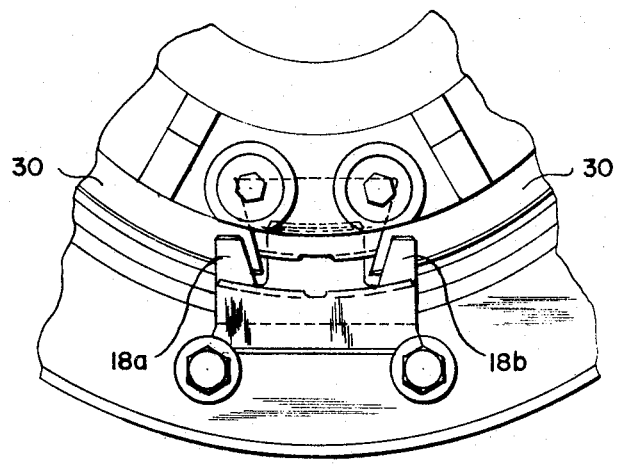
FIG. 4 is an end view broken away of one of the slip segments or assemblies of the embodiment of FIG. 1.

As illustrated in FIG. 1, the pipe clamp apparatus of the present invention comprises a housing 11 having interconnected substantially cylindrical upper and lower housing members 12 and 13, respectively. The upper housing member 12 is attached or connected by means such as bolts or studs 14 to a carrier body 15. The carrier body 15 may be any apparatus for manipulating or any way of applying power or force through the pipe clamp of the present invention to a section of pipe or hollow pile member. For example, the carrier body may be a hoist or lift apparatus or it may be a resonant pile driver. The present invention is especially adapted for use with resonant pile or conduit drivers. The upper and lower housing members 12 and 13 are connected together as by means of a breech-lock threaded coupling which is more fully illustrated in FIG. 5.

The main pipe gripping unit of the present apparatus is contained in a lower housing member 13. This lower housing member is generally of somewhat cylindrical configuration with a central throughbore of varying diameters forming a somewhat bell-shaped interior. The lower housing member 13 has an outwardly and downwardly sloping slip slots or pockets 21 formed in the lower pipe receiving bore 17 thereof. One form of the pipe gripping unit of the present apparatus is shown in FIGS. 1–4. The pipe gripper jaws of this unit are made up of a plurality of pairs of wedge-shaped gripper elements or slip assemblies concentrically arranged in spaced relationship from each other around the interior circumference of the slip bowl at the open end of the lower housing 13. Each gripper or slip assembly comprises a pair of slip segments 18 or 19 mounted for radial movement into engagement with a cylindrical pipe or member 20 to be gripped. The outer slip segments 18 are retained in spaced relationship from each other around the circumference of the slip bowl preferably by being confined in the forementioned slots 21 which are equal in number to pairs of slips. Each of these slots 21 is preferably of a dovetailed or interlocking configuration corresponding to a cooperatingly shaped portion on the outer surface of slip 18 which retains the slip 18 in radial position and allows movement relative to the housing both axially and in plane sloping outward with surface 22. Travel of each of the outer slips 18 is limited in downward movement by shoulders on slip 18 engaging stop means in the form of a washer 23 which is held in place by means of a stud or bolt 24. The upper limit of travel of the slip segments 18 is determined by the engagement of the upper end of the slip segment with shoulder 25 of the housing. The inner slip segments 19 are confined for relative movement within downwardly and outwardly longitudinal slots 27 formed in the outer periphery of cylinder member 26. The radial sides of said slots are dovetailed to cooperate with mating surfaces of slips 19 so that motion between the elements is directed in plane with the inwardly disposed tapered surface. The inner slip segment 19 is mounted by means of a slide portion between guide shoulders 28 and 29 for radial movement with respect to the housing member 13.

The prime mover means for moving the pipe gripping inner slip segments into and out of engagement with the pipe or conduit member comprises, in this illustrated embodiment, a fluid-operated piston and cylinder assembly which is in operative engagement with the gripping means through the outwardly downwardly sloping dovetailed groove means 27 which act as camming surfaces. The outer 22 and inner 27 camming surfaces may have the same or a different slope. The outer slip 18 (FIG. 1) has inwardly extending finger members 18a and 18b (FIGS. 2 and 4) which extend to either side of the inner slip segment 19 and are adapted to be engaged by shoulder or flange means 30 which extends circumferentially around the upper portion of the cylinder member 26. Thus it can be seen that the internal gripping or slip segment 19 is confined between shoulders 28 and 29 for radial movement within the housing means under the camming action of the sloping surfaces 27 on the cylinder means 26.

The reciprocating cylinder member 26 is reciprocably mounted on stationary piston member 31 and axially extending central support member 32. The fixed piston member 31 is supported such as by thread means 32a on central support member 32. The cylinder member 26 has a central cylindrical bore 33 which is separated by means of fixed piston means 31 into a pair of variable volume chambers 33a and 33b. A cover plate 34 closes off the lower end of the central cylindrical bore 33, thus forming chamber 33b. The cover plate 34 has a plurality of depending guide means 35 to facilitate guidance of the gripper assembly into proper alignment within the bore of the pipe member 20. An external source of pressurized fluid (not shown) communicates via port means 36a, conduit means 36, and exit port 37 with the upper pressure chamber 33a. Similar conduit means 38 communicates from a like external source of pressurized fluid via exit 39 into the lower pressure chamber 33b. The central support member 32 extends through a central opening 40 in the open portion of the lower housing member 13 and is yieldably retained in co-axial alignment with the housing by suitable means such as by cap member 41 and is centered by a resilient grommet 41a. This feature provides for the pipe out-of-round adjustment feature in the clamp. This grommet yields to the lateral forces developed in piston rod or support member 32 as the cylinder is radially displaced to meet out-of-round pipe conditions, thus eliminating bi-axial forces being imposed in the structure. A manifold member 42 assures proper communication between the conduits 36a and 38a formed in the lower housing member 13 and conduits 36 and 38 formed in the central support member 32. The cap member 41 is held in place by a number of stud bolts or cap screws 43 (see FIG. 2).

Figure 5:
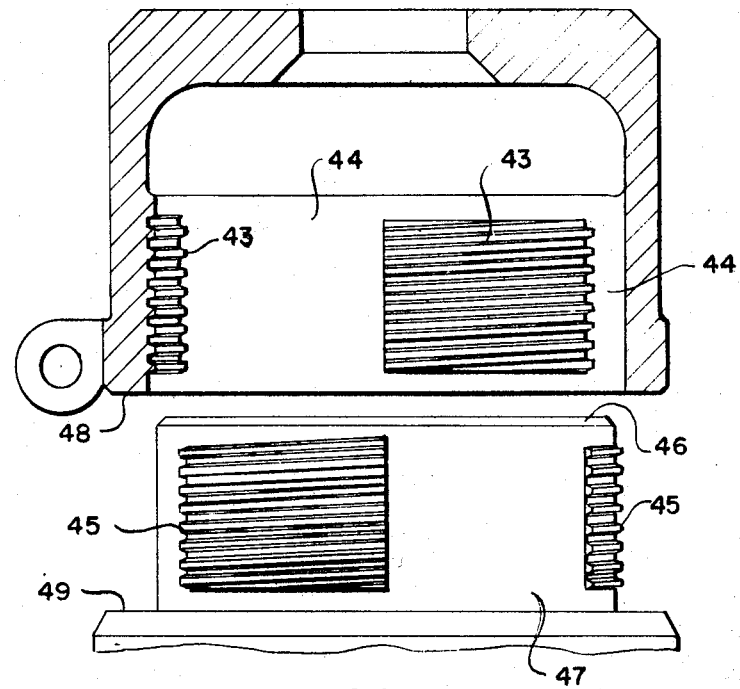
FIG. 5 is a side elevation in section of the coupling between the housing members of the present invention.

The coupling or connector means of the lower housing member to the upper housing member is more fully illustrated in FIG. 5. As seen in FIG. 5, the upper housing member has a substantially cylindrical central bore in which thread segments 43 are formed with spaced blank areas between the thread segments. Each thread segment 43 is slightly narrower than each blank area 44. External thread segments 45 are formed on the outer cylindrical portion 46 of the lower housing member. Corresponding blank areas 47 are formed between the thread segments 45 on the cylindrical portion 46. In coupling these two members together, the threaded portions 45 on the lower member are lined up with the blank areas 44 on the upper member and the cylindrical member then inserted in the bore of the upper member. Rotation of the members relative to one another brings the threads 45 and 43 into engagement with one another and continued rotation thereof brings shoulder members 48 and 49 into tight engagement with one another. The members are then retained in a set engaged position by means of appropriately positioned lugs 50 and 51 through which a bolt 52 is inserted and tightened.

Figure 7:
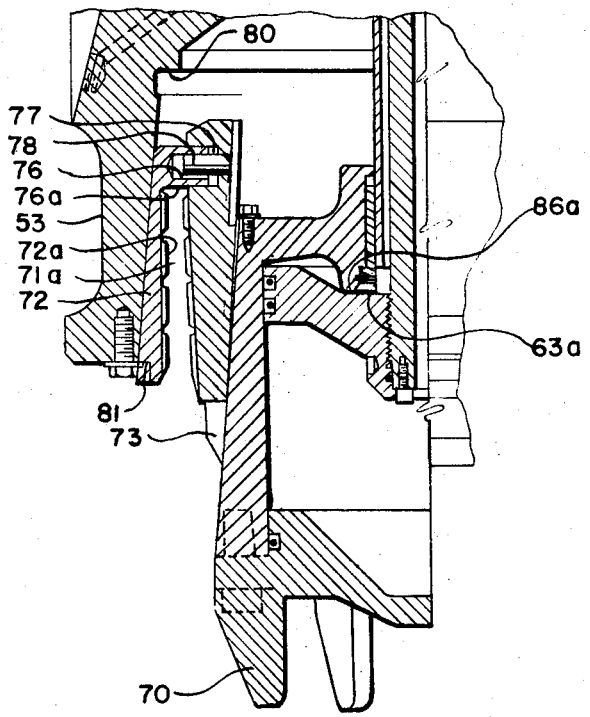
FIG. 7 is a partial section view broken away of the embodiment of FIG. 6 in a partially open position.
Figure 6:
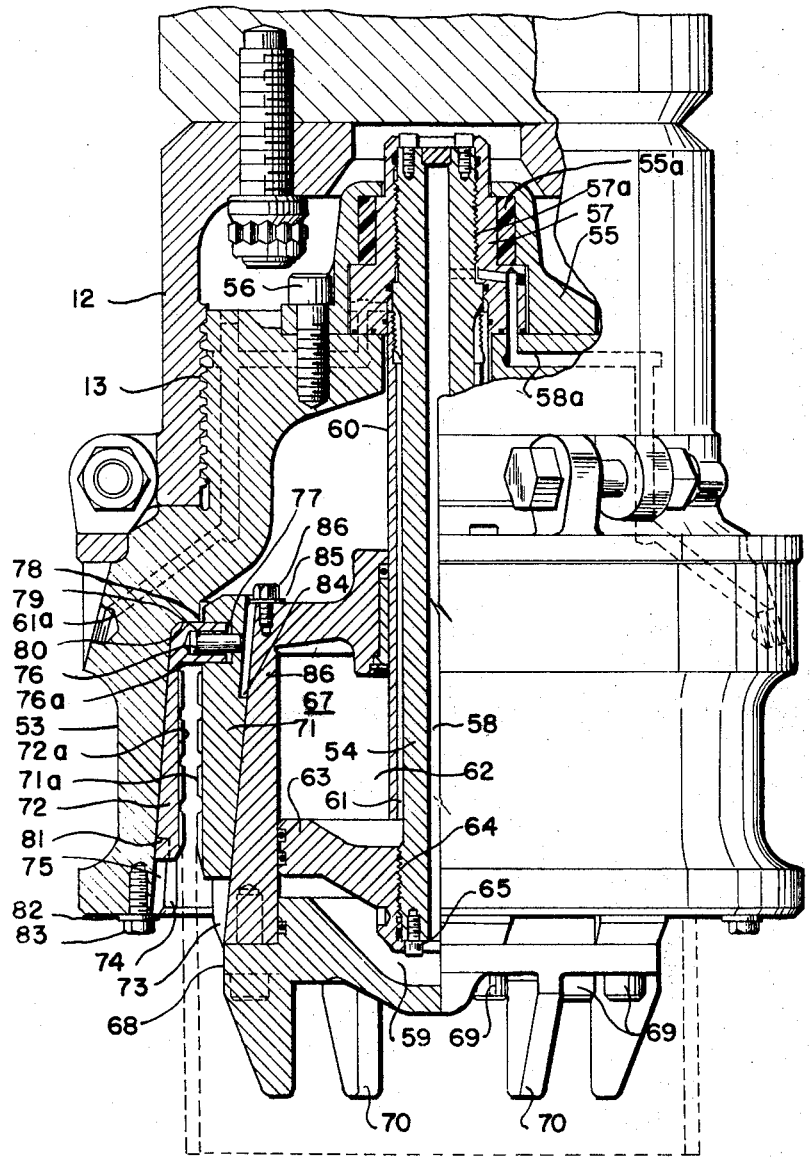
FIG. 6 is a side elevation partially in section of a second embodiment of the apparatus of the present invention.

A second embodiment of an apparatus of the present invention is shown in FIGS. 6 and 7. The distinguishing difference between the embodiment as shown in FIGS. 1 to 4 inclusive and the alternative as illustrated in FIGS. 6 and 7 is that in the former the inner slip 19 wedging action cannot be influenced by force acting on the clamp housing for reasons of the restraining engagement of surfaces 28 and 29 acting on the slip; in contrast, in the latter embodiment, restraint of movement of the inner slip is dependent on cylinder motion. In this second embodiment as shown in FIG. 6 an upper housing member 12 is connected by means of breech coupling 16 as in the previous embodiment to a lower body member 53. An elongated support member 54 extends along the axis of the central bore of the housing member 53 and is yieldably supported therein by means of a resilient grommet 55a and a cap member 55 which in turn is held in place by means of cap screws 56. This yieldability permits automatic lateral adjustment of the gripping apparatus to accommodate an out-of-round pipe. A manifold member 57 is secured by means of threads 57a on the upper end of the elongated member 54 to insure proper communication between conduit means 58a and 61a formed in the housing member and conduit means 58 and 61 formed in the elongated member. A central bore 58 is formed in conduit member 54 to serve as conduit means to a lower pressure chamber 59. An elongated tubular member 60 is mounted at its upper end in the housing and extends along concentric with member 54 to form an annular chamber 61 which serves as conduit for fluid into the upper chamber 62. A piston member 63 is supported such as by threads 64 and locked in place by cap screw 65 on the elongated member 54. A cylinder member 66 having a central bore 67 is reciprocably mounted on the elongated member 60 and piston member 63. The fixed piston member 63 is positioned in central bore 67 and separates the central bore into an upper chamber 62 and a lower chamber 59. A cap member 68 closes off the lower end of the central bore 67 to enclose the lower chamber 59. Cap member 68 is held in place by means of cap screws 69. Guide element 70 extends downward from cap member 68 to facilitate guidance of the apparatus into the central bore of a pipe member.

The gripper jaws of this apparatus are made up of a plurality of pairs of wedge-shaped gripper elements or slip assemblies concentrically arranged around the interior circumference of the slip bowl of the lower end of the housing 53. Each gripper or slipper assembly comprises a pair of slip segments which include an inner slip segment 71 and an outer slip segment 72. The inner slips 71 are mounted in sloping dovetailed grooves 73 which are annularly spaced around the outer surface of the cylinder member 66. The outer slip segments 72 are slidably disposed in downwardly and outwardly sloping grooves 74 formed in the inner surface of the slip bowl 73. Both inner and outer slip segments slid together by means of a flange or tongue 78 which projects inwardly from the outer slip 72 and which extends into a slot 77 formed on the inner slip member 71. The pin 79 mounted in the slot 77 extends into bore 79 formed in tongue portion or flange portion 76 of the outer slip 72 to insure further stability of the connection between the two members and to retain relative radial alignment of the inner and outer slip segments. The upper limit of travel of the outer slip segment 72 is determined by shoulder member or the abutment of the upper end of the member with shoulder 80 on the inner portion of housing member 53. The lower limit of travel of the outer slip segment 72 is determined by shoulder member 81 and stop means in the form of washer and screw member 82 and 83. The lower limits of travel of the cylinder member 66 with respect to the slip assembly is determined by the abutment of shoulder 84 and stop means in the form of washer 85 and screw means 86. As can readily be seen from the foregoing illustrations, the slip segments move together along the respective slots and are cammed toward or away from each other by action of cylinder 66.

OPERATION

Figure 2:
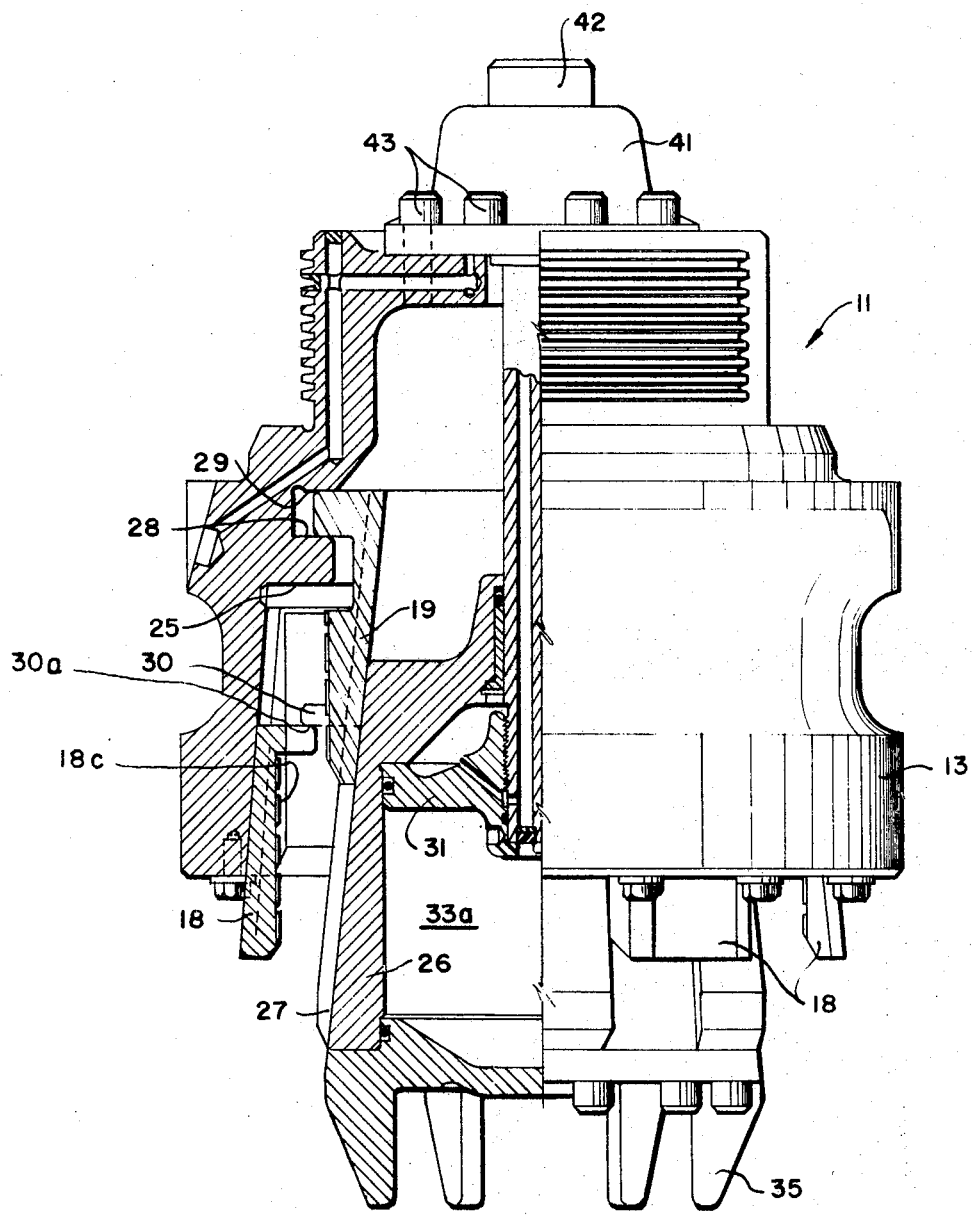
FIG. 2 is a side elevation partially in section of the embodiment of FIG. 1 shown in a fully disengaged position.

The gripping apparatus of a first embodiment of the present invention is shown in a closed or gripping engagement position in FIG. 1 and in an open or releasing position in FIG. 2. When in the closed position as in FIG. 1, the cylinder member 26 is in its uppermost position with fluid pressure in chamber 33.

Preparatory to receiving the pipe, the clamp is conditioned as illustrated in FIG. 2, with the cylinder 26 in the downward limited position, being in shoulder engagement with the piston 31 and with the inner slips 19 in full retracted position. In such condition, shoulder projection 30 of the cylinder is engaged by the outer slip projections 18a and 18b; the outer slips 18 have been moved downwardly and outwardly in fully expanded position. In the open or released position, as above described, with fluid pressure in chamber 33a, all elements of the clamp assembly are retained in fixed unoperative relationship. The cylinder is restrained from movement through shoulder abutment with the piston, inner wedge is retained by cooperation with housing shoulders 28 and 29 and dovetail cylinder solts 27, and the outer slip is held immovable by dovetail housing slots 21, cylinder projections 30, and stop washer 23. In operation, fluid pressure is retained in chamber 33a as the clamp is lowered over and into a pipe 20 until downward motion is arrested by abutment of the pipe with the lower surface of outer wedge propjections 18a and 18b. With continued pipe insertion force (clamp weight) being applied, fluid pressure is released from chamber 33a. With the cylinder being thus released for action, the initial effect is to permit further downward movement of the housing 11 with relative axial movement of the pipe, outer slip 18 and cylinder 26 being prevented by constraining surface engagement of surfaces 18c and 30a acting on their associated elements. Downward movement of the housing is arrested by the inner gripping surface 18c of the outer wedge 18 being moved into gripping engagement with pipe surface. The arrested motion between outer slips 18 and housing 13 may accrue at any point between stop limits 23 and 25, depending upon the varied outside diameter of the pipe. Following arrested motion of the outer slips 18 and the housing 13, fluid pressure is applied to chamber 33, which thereby causes upward movement of the cylinder 26 until the inner wedges 19 have been moved into gripping engagement with the internal pipe surface.

In operation of the embodiment of the apparatus of FIGS. 6 and 7, fluid under pressure is admitted to chamber 62 forcing cylinder member 66 in the upper position which cams the slip segments into closed or engaged position as shown in FIG. 6. The outer segments 72 is in its innermost or gripping position when it has reached the uppermost position in the slide 75. The inner slip segment 71 is cammed outward by the sloping surface on the outer surface of cylinder member 66. Release of the gripping apparatus from its engaged position as shown in FIG. 6 is accomplished by exhausting fluid pressure from chamber 62 and admitting fluid under pressure into chamber 59, thus forcing the cylinder member downward with respect to the piston member 63. This downward movement of cylinder member 66 moves segment 71 inward under the action of the dovetailed groove arrangement 73. When the stop means 85 comes into engagement with shoulder 84, it determines the innermost position of the slip segment 71. At this point, the outer segment 72 begins to move downward with the piston means and is cammed outward by the action of the dovetailed groove 75. This outer slip segment 72 moves downward until abutment 81 comes into engagement with stop means 82, thus marking the lowermost limit of travel of segment 72 and likewise its outermost movement. To apply the above apparatus on the open end of a pipe the lower cylinder chamber 59 is pressured to condition and maintain the assembly in open or pipe receiving arrangement as shown in FIG. 7, the apparatus is then lowered with the walls of the pipe in alignment with the annular space between the slip segments until the end of the pipe comes into engagement with abutment or shoulder 76a; at this point, the weight of the clamp apparatus and carrier apparatus is supported from the outer wedges. With continued garational or like force being applied to the pipe end thru the apparatus the pressure is transferred from cylinder chamber 59 to chamber 62 this in effect caused the cylinder to move upward and cams or forces each slip segment 72 upward along groove or cam track 75, camming this member inward to its innermost position until the gripping surface 72 of this member comes into engagement with the outer surface of the pipe or the abutment shoulder 80 of the lower housing. This action also carries the corresponding slip segment 71 upward along groove 73. Relative movement of the clamp elements as well as the pipe becomes static as the slips are moved into wedging engagement with the pipe.

The drawings and descriptions are merely illustrative of the invention and are not intended to restrict the invention in any way, as many modifications are possible within the spirit and scope of the appended claims.

I claim as my invention:

1. In a pipe clamping apparatus;
a housing having an open end;
first and second moveable gripping means mounted in said open end of said housing for movement into engagement with the interior and exterior of the end portion of a section of pipe;
prime mover means mounted in said housing;
means for positively moving said gripping means in directions toward and away from the axis of said pipe for selectively gripping and releasing the same;
said last named means including slidably interengaging camming means between said prime mover means and one of said gripping means for positively camming said last named gripping means in opposite directions toward and away from said pipe axis; and
means slidably mounting the other of said gripping means on the inner wall of said housing for axial movement relative thereto.

2. The apparatus of claim 1 wherein:
said gripping means comprises a plurality of pairs of opposed slip segments arranged concentrically within said open end of said housing.

3. The apparatus of claim 1 wherein:
said prime mover means is a fluid operated piston and cylinder assembly.

4. The apparatus of claim 3 comprising:
first connector means for connecting said housing member to a carrier body means, said connector means being secured to said housing member opposite the open end thereof; and
said connecting means comprising a substantially cylindrical member threadably engaging said housing.

5. The apparatus of claim 3 comprising:
support means for said piston and said cylinder assembly resiliently mounted in said housing and extending substantially along the axis thereof;
said piston fixed to said support means;
said cylinder assembly reciprocably mounted on said piston and said support means.

6. In a pipe clamping apparatus:
a housing having an open end;
first and second moveable gripping means mounted in said open end of said housing for movement into engagement with the interior and exterior of the end portion of a section of pipe;
prime mover means mounted in said housing;
camming means carried by said prime mover means, and adapted to slidably engage one of said first and second gripping means;
the other of said gripping means auxiliary slidably engaging the inner wall of said housing;
said camming means being operative to move said one of said gripping means into and out of engagement with said pipe; said gripping means comprising a plurality of pairs of opposed slip segments arranged concentrically within said open end of said housing;
said pairs of slip segments comprising an outer slip segment and an inner slip segment;
one slip segment of each pair of segments is slidably mounted in engagement with said housing member; and
the other of said pair of slip segments is slidably carried by said prime mover means.

7. The apparatus of claim 6 comprising:
means extending from said prime mover means for moving said outer gripping means out of engagement with said pipe.

8. The apparatus of claim 6 comprising:
connecting means operatively connecting said outer and said inner segments for substantially simultaneous movement axially of said housing.

References Cited

UNITED STATES PATENTS

| | | | |
|---|---|---|---|
| 1,757,363 | 5/1930 | Fischbach | 294—86.15 |
| 3,396,980 | 8/1968 | Muller | 294—86.12 |

EVON C. BLUNK, Primary Examiner

D. D. WATTS, Assistant Examiner